United States Patent [19]
Nakayashiki et al.

[11] Patent Number: 5,912,903
[45] Date of Patent: Jun. 15, 1999

[54] METHOD AND SYSTEM FOR QUICKLY TRANSFERRING DATA IN A NETWORK HAVING COMPUTERS CONNECTED THEREWITH

[75] Inventors: Susumu Nakayashiki, Sagamihara; Yoshitsugu Abe; Mitsugu Kohatsu, both of Hadano; Kiyoyuki Takemi, Odawara; Osamu Kinoshita, Hadano, all of Japan

[73] Assignee: Hitachi, Ltd., Tokyo, Japan

[21] Appl. No.: 08/728,550

[22] Filed: Oct. 9, 1996

[30] Foreign Application Priority Data

Oct. 11, 1995 [JP] Japan .................................. 7-289271

[51] Int. Cl.⁶ ........................................................ H04L 1/18
[52] U.S. Cl. ...................... 371/33; 371/49.1; 370/217; 370/236; 395/200.39
[58] Field of Search ..................... 371/33, 49.1; 370/217, 370/236, 355, 400, 451; 395/200.39; 364/241.8; 369/59, 50, 47, 60, 275.3, 48, 32; 386/95, 48, 126

[56] References Cited

U.S. PATENT DOCUMENTS

4,701,908  10/1987  Ikeda ........................................ 370/85
5,396,485  3/1995  Ohno et al. ............................... 370/16
5,490,134  2/1996  Fernandes et al. ....................... 370/79

Primary Examiner—Reba I. Elmore
Assistant Examiner—McDieunel Marc
Attorney, Agent, or Firm—Antonelli, Terry, Stout & Kraus, LLP

[57] ABSTRACT

A communication method applied to a communication system is provided for enhancing communication performance such as a throughput and a turn around time in the so-called intra-computer communication. In the communication procedure, when a source end system (SES) like a host computer transfers data to a destination end system (DES) such as a LAN or a WAN through a communication control system (CCS), the CCS served as a virtual destination receives the data and transmits an acknowledge (+Cresp) to the SES. In response to the acknowledge (+Crest), the SES performs the next transfer of the data. In response to the last acknowledge, the SES operates to output an indication about completion of the data transmission (End TX-C). The CCS continues to transfer the data temporarily received from the SES to the DES unless the CCS receives the acknowledge from the DES. The acknowledge +Cresp contains information about an amount of data transferred from the CCS to the DES. The SES operates to calculate an amount of data to be transferred on the basis of the amount of transferred data contained in the information, a window size and the amount of data so far transferred to the CCS.

18 Claims, 11 Drawing Sheets

METHOD AND SYSTEM FOR QUICKLY TRANSFERRING DATA IN A NETWORK HAVING COMPUTERS CONNECTED THEREWITH

BACKGROUND OF THE INVENTION

The present invention relates to a method and system for communicating data among devices broadly defined as computers, such as a host computer and a workstation, connected in a communication network such as a local area network (LAN), a metropolitan area network (MAN) or wide area network (WAN), and more particularly a data transfer method arranged to improve communication performance there between throughput and turn-around time between computers.

Conventionally, communication protocol such as TCP/IP (Transmission Control Protocol/Internet Protocol) has been used for exchanging data between the end systems, simply called ES, of the computer devices connected with the communication network. This communication network provides flow control for data transfer at each connection between the end systems (ES) of the computer devices communicating with each other.

For example, the TCP/IP provides sliding window control for serially sending out data packets without receiving an acknowledge packet from a destination device. This sliding window control has a function of continuously sending out data packets without receiving the ACK packet unless the amount of data to be sent exceeds a window size. The window size is defined as an amount of data permitted to be sent out without receiving the ACK packet from the destination device. As such, the sliding window control allows the data to be pushed out if no ACK is received. This leads to enhancing the efficiency of the communication protocol.

As has been often noted, the foregoing prior art has a disadvantage in that the computer device does not make the most of a communication network though the network provides a fast connecting interface. If a file is transferred on the TCP/IP, this disadvantage is brought about by propagation delay of the ACK packet of the TCP/IP.

The TCP/IP, as mentioned above, provides the sliding window control, so that it can transmit data without receiving the ACK packet from the destination device, unless the amount of data to be transmitted reaches the window size. However, if no ACK is given back by the destination device, the TCP/IP does not allow a larger amount of data than the window size to be sent out to the destination device.

With increase of the propagation delay, it takes a longer time for the source device to receive the ACK from the destination device, so the source device needs a longer waiting time for further data transmission. This results in lowering the performance (for example, the throughput) of the communication between the source device and the destination device.

As an example, consider the case that data is sent out to a destination device located at a distance of 1000 Kilometers. In this case, the propagation delay time is 0.003 second (on the assumption that the propagation speed is 300,000,000 meters). Hence, the propagation of the data to the destination device needs the time of 0.003 second and likewise a response of the ACK to the sending device needs the time of 0.003 second.

On the other hand, when the data of about 48 kbytes (about 360 kilo bits) is transmitted through an interface of 155 Mbps, the transmission needs a time of about 0.003 second if the window size is defined as 48 kbytes. The transmission time is substantially analogous to the subsequent propagation delay time. Thus about a half of the transmission time is wasted, that is, idle in the transmitting process.

When data is transferred through a communication network having a large propagation delay time, basically, the waiting time for transmitting the data is made longer. This means that full advantage is not taken of the communication network provided with a fast interface. Hence, though the faster interface is connected with the communication network, the performance of transferring the data is not improved accordingly.

SUMMARY OF THE INVENTION

An object of the present invention is to provide a method and system for implementing fast data transfer between computers connected to a network.

Another object of the present invention is to provide a communication method and system for improving communication performance, including throughput and turn-around time between computers connected in a network.

In carrying out the objects of the invention, according to an aspect of the invention, a communication method applied to a communication system arranged to have a host computer, a communication control station and a communication end system, make a local connection between the host computer and the communication control station and a remote connection between the communication control station and the communication end system, and exchange data with the communication end system terminal through the communication control station, includes the steps of enabling the communication control station to sequentially transfer to the remote connection the data received from host computer through the local connection and sequentially transfer to the local connection the data received through the remote connection and enabling the host computer to treat the communication with the communication control station through the local connection as the communication with the communication end system in executing the communicating procedure.

The communication control unit operates to transit to the host computer information indicative of the amount of the data received from the communication host and then transmitted to the remote connection together with the receive ACK. The host computer treats an amount of data derived by subtracting the amount of data transmitted to the communication control station from the addition of the amount of data sent back by the communication control station to the window size as an amount of data to be transmitted to the communication control station.

The communication control station and the communication end system operate to send their respective acknowledgements to the host computer. The host computer selects any one of these acknowledgements for considering it as termination of the data transmission.

According to another aspect of the invention, a communication method applied to a communication system arranged to have two or more communication end systems, one or more communication servers and a communication network and further intended to make a local connection between the communication end system and the communication server and a server connection among the communication servers, includes the step of enabling the data transmission end system (that is, the source end system) to treat the communication executed through the local connection as the communication with the data receiving end system (that is, the destination end system) in executing the communication procedure.

The communication server and the communication end system connected with the source end system through the local connection operate to send their respective acknowledgements to the source end system. The source station selects any one of the acknowledges for considering it as termination of the data transmission.

Other objects, features and advantages of the invention will become apparent from the following detailed description of the embodiments of the invention taken in conjunction with the accompanying drawings.

BRIEF DESCRIPTION OF THE DRAWINGS

FIG. 5 is a block diagram showing a logical hierarchical arrangement of a communication connection between the source and the destination ESs of;

DESCRIPTION OF THE PREFERRED EMBODIMENTS

Figure 1:
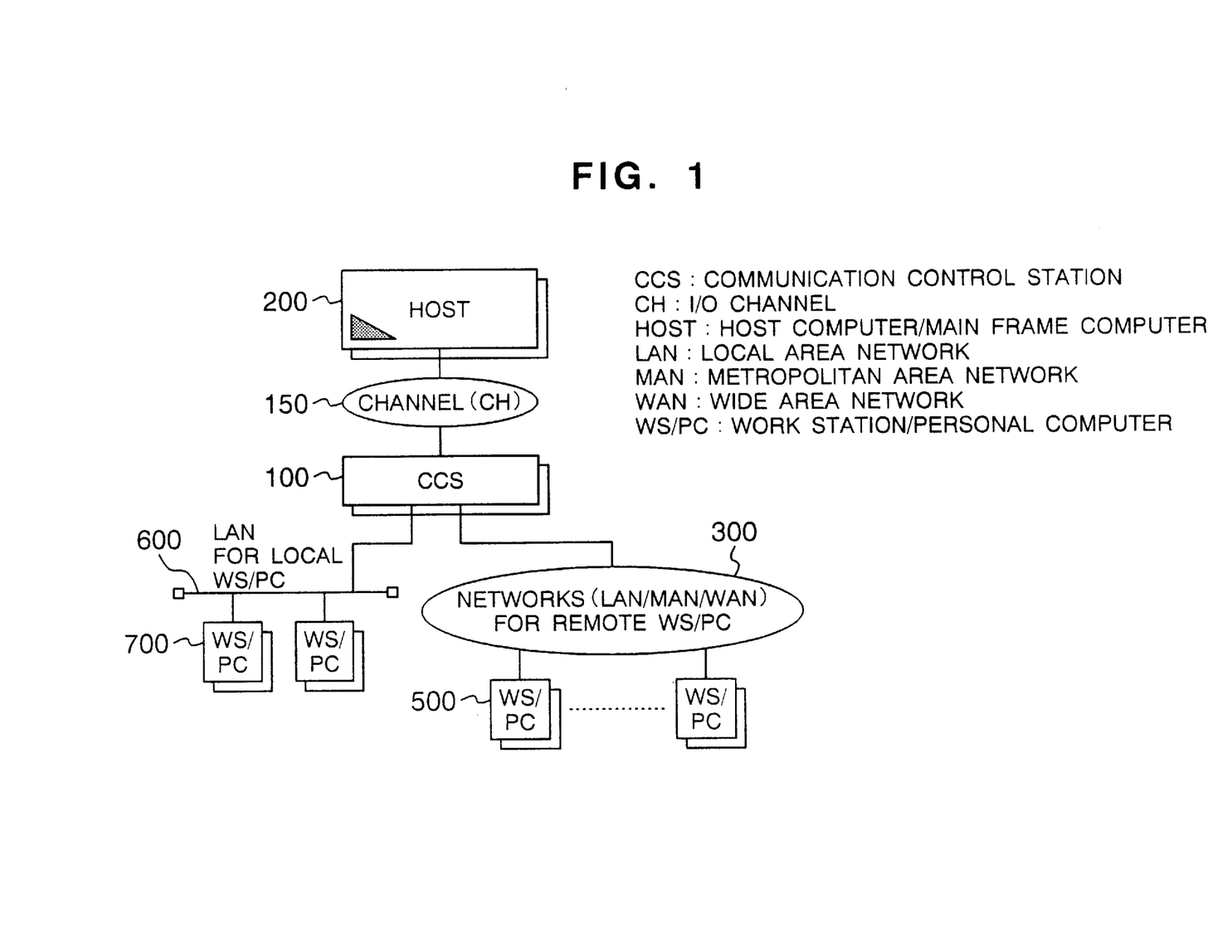
FIG. 1 is a block diagram showing an arrangement of a communication system according to an embodiment of the present invention.

FIG. 1 illustrates an arrangement of a communication system according to an embodiment of the invention.

In FIG. 1, a numeral 100 denotes a communication control station (CCS). A numeral 150 denotes an I/O channel (CH). A numeral 200 denotes a host computer (HOST) or a mainframe computer. A numeral 300 denotes a communication network, which includes a local area network (LAN) such as a private network that does not cross a public road, a metropolitan area network (MAN), and a wide area network (WAN) such as a public phone network.

A numeral 500 denotes a group of workstations (WS) or personal computers (PC), which are located as destination end systems of the HOST 200 (remote end of this communication system). A numeral 600 denotes a LAN for maintenance installed on the side of the CCS 100, (which is a local end of this communication system). A numeral 700 denotes a group of WS/PC (just called WS/PC) serving as maintenance terminals. Through the LAN 600, the WS/PC 700, for example, takes charge of the promotion and management of the CCS 100 or the collection of pieces of data through the CCS 100.

Figure 2:
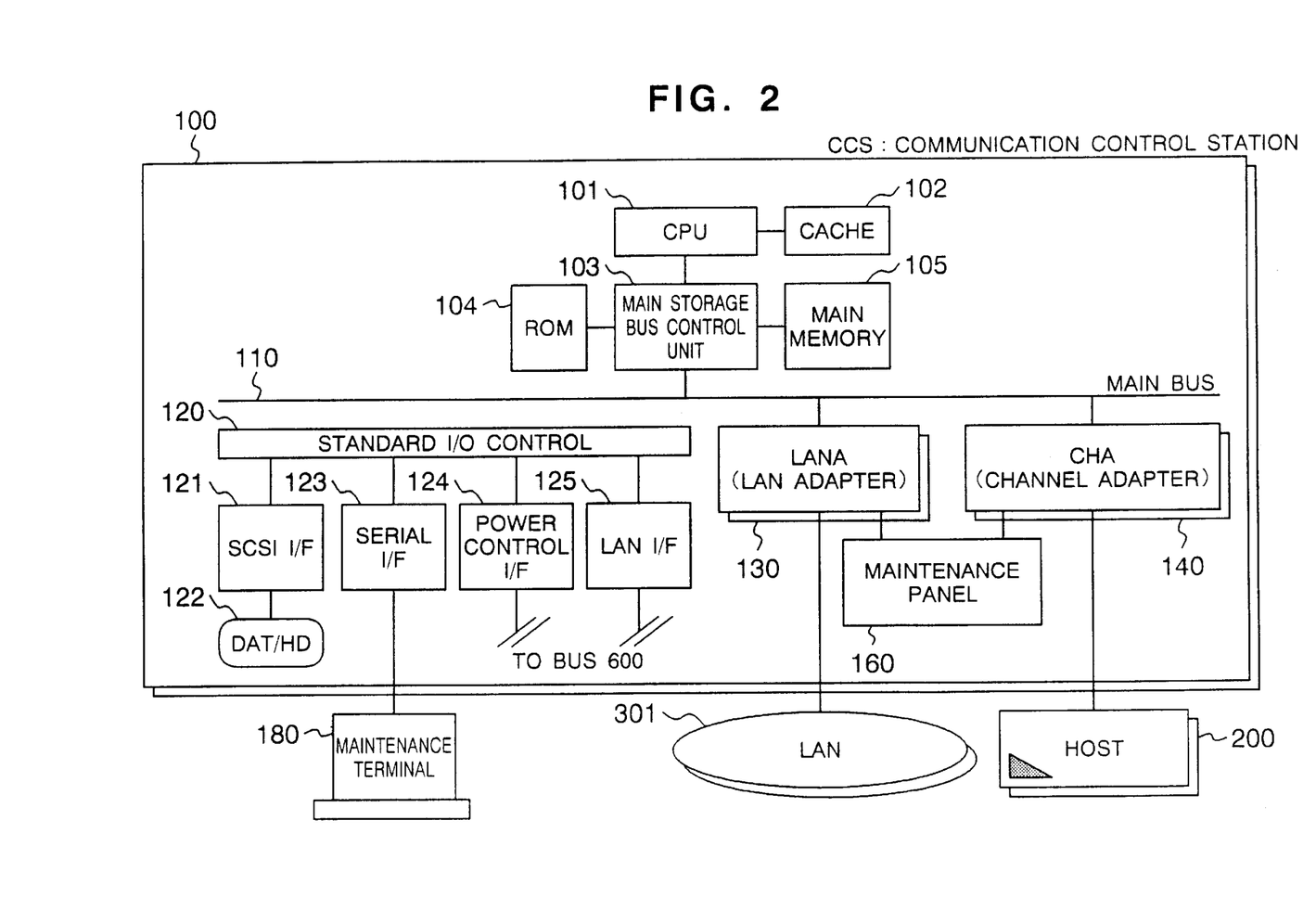
FIG. 2 is a block diagram showing an internal arrangement of a communication control station (CCS)

FIG. 2 illustrates an internal arrangement of the CCS 100.

In FIG. 2, a numeral 101 denotes a central processing unit (CPU). A numeral 102 denotes a cache memory. A numeral 103 denotes a bus control unit. A numeral 104 denotes a read-only memory (ROM). A numeral 105 denotes a main memory (MM). A numeral 110 denotes a main bus of the CCS 100, which utilizes a personal computer interface (PCI), for example.

A numeral 120 denotes an I/O common mechanism for taking charge of various standard Input/Output (I/O) controls. The I/O common mechanism 120 includes a small computer system interface (SCSI) 121, a serial interface (SI) 123, a power control (PC) 124, and a LAN interface (LI) 125.

A numeral 122 denotes a storage unit for storing information transferred through the SCSI 121, which may be a digital audio tape (DAT) or a hard disk (HD). A numeral 180 denotes a terminal for maintenance, which is used to, for example, set an initial state of the CCS 100. The LI 125 is connected to the LAN 600 located on the local side of this communication system.

A numeral 130 denotes a LAN adapter (LANA), which may be connected to a LAN 301 such as an Ethernet, a token ring or a fiber distributed date. interface (FDDI). In particular, the LAN adapter LANA includes communication units for a physical layer (PHY) and a data link layer (DLC) of the LAN.

The DLC contains a communication unit for a medium access control (MAC). Another communication unit for a logical link control (LLC) layer may be mounted to the DLC. Likewise, the DLC may contain X.25 or a frame relay of the WAN or an interface to the communication network at an asynchronous transfer mode (ATM).

In this embodiment, the CCS includes the LANA 130 connected to the LAN 301, which is further connected to the MAN or WAN.

A numeral 140 denotes a channel adapter (CHA), which takes charge of connection between the CCS 100 and the HOST 200. This CHA may be the so-called enterprise system connection (ESCON) mechanism or giber channel (FC) mechanism. The LANA 130 and the CHA 140 contain a CPU for controlling each adaption, a memory, and a buffer memory for temporarily storing data to be transferred, respectively. A numeral 160 is a maintenance panel, which displays the states of the LANA 130 and the CHA 140.

Then, the operation of the CCS 100 will be briefly described below.

When power is on, at first, a bootstrap program pre-stored in the ROM 104 is started so that the information about the controls for the overall CCS 100, the LANA 130 and the CHA 140 is initially program-loaded (IPLed) from the storage unit 122 like the hard disk to the MM 105. Next, the download from the MM 105 to the LANA 130 and the CHA 140 is executed under the control of the CPU 101. For example the data sent from the HOST 200 is temporarily stored in the buffer located in the CHA 140.

At this time, a data receive interrupt is given from the CHA 140 to the CPU 101. Then, the CPU 101 operates to transfer the data temporarily stored in the CHA 140 to the MM 105 through a main bus 110. Next, the data is passed from the MM 105 to the LANA 130 and then is sent out to the LAN 301.

Figure 3:
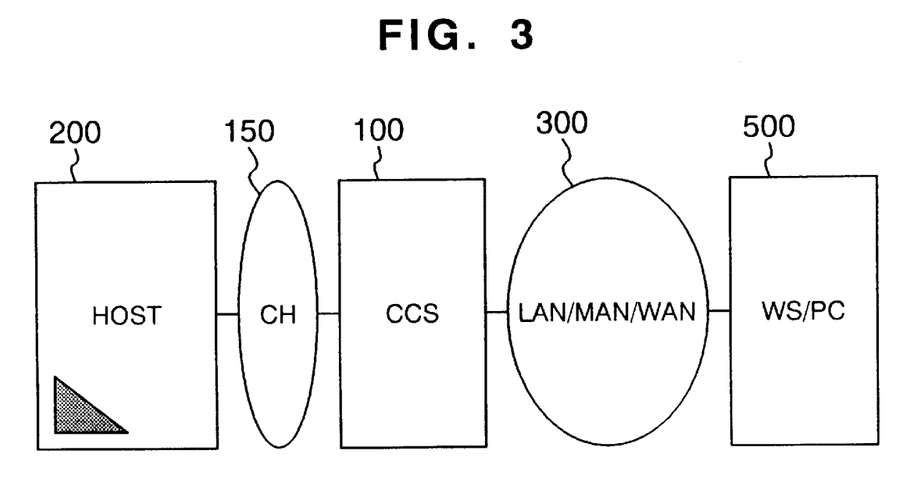
FIG. 3 is a block diagram showing a connection of a communication path leading from an end system (ES) of a source station to an ES of a destination station through the CCS.

FIG. 3 models a physical communication connection between the HOST 200 and the WS/PC 500 located on the remote side of the HOST 200.

As is obvious from the model of FIG. 3, the HOST 200 is connected to the communication network 300 through the CH 150 and the CCS 100. The communication network 300 is further connected to the WS/PC 500. The WS/PC 500 may be connected to the WAN directly or through the LAN. Herein, the path leading from the CCS 100 to the WS/PC 500 is generally called the communication network 300.

Figure 4:
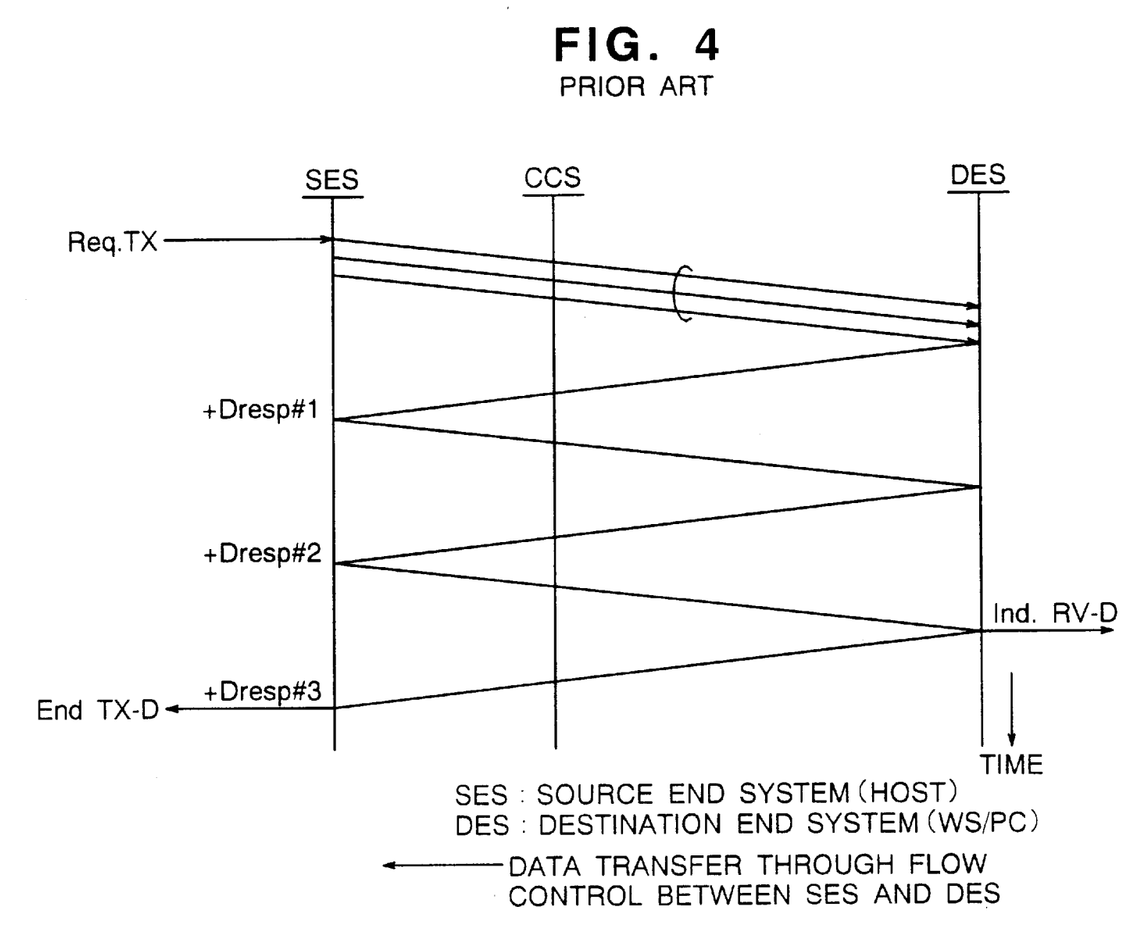
FIG. 4 is a sequence chart showing the conventional data transfer between the source and the destination ESs.

In comparison with the present invention, the description will be oriented to how the data is transferred under the flow control (FC) of the prior art with reference to the sequence of the prior art shown in FIG. 4.

In FIG. 4, the system components used in the data transfer on one connection made between the HOST 200 and the WS/PS 500 are arranged to correspond to the connecting model as shown in FIG. 3. Then, the HOST 200 in FIG. 3 corresponds to a source end system (SES), and the WS/PC 500 in FIG. 3 corresponds to a destination end system (DES). The data transfer sequence between both of the end systems is roughly described in time series.

The SES operates to transfer data to the DES in response to the request for the data transfer (Req. TX).

Under the flow control, the SES can serially transmit data without waiting for an acknowledgement (+Dresp#x) from the DES, unless the amount of the transmitted data is within the window size. In some cases, the SES may serially transmit data packets until the DES send the acknowledgement to the SES. However, FIG. 4 shows the sequence for one transmission.

In the sequence, the SES starts to transfer the data to the DES in response to the request for the data transfer. However, the amount of the data to be given at the first transfer is equal to or less than the window size. For example, it may be a half or two-thirds of the window size.

In response to the +Dresp#1 from the DES, the SES operates to execute the second data transfer. The amount of the data to be transferred is equal to or smaller than the window size. In the illustrative sequence, the data transfer from the SES to the DES is terminated at the third transfer.

When the DES completes the third reception of the data, the DES operates to send the acknowledgement +Dresp#3 to the SES. Then, the DES generates an indication about data reception (Ind. RV-D) and then reports it to the DES.

In response to the acknowledgement +Dresp#3 from the DES, the SES operates to generate an indication about the data transmission end (End TX-D) at the layer 403 and report it to an upper layer 402 in FIG. 5 as described next.

The data request for data transfer (Req. TX), the indication about data reception (Ind. RV-D) and the indication about data transmission end (End TX-D) are all reflected on commands and primitives exchanged between a mechanism for taking charge of a data transfer function, for which the software program is commonly used, and a mechanism for utilizing the data, which corresponds to the software program itself. (This matter will be discussed below with reference to FIG. 5.)

The CCS is involved in the sequence shown in FIG. 4. Conventionally, in order to reduce the load of a host (or provide a protocol off load) the CCS serves as a repeat station or a repeat device located on the way of transferring data between the ESs and thus serves to increase the resident time of the data inside of the network. However, the CCS is not concerned with the data transfer sequence between the ESs. In the data transfer, the CCS, therefore, brings about the propagation delay that increases the waiting time of both of the ESs. This increase leads to lowering the communication performance between the ESs. It means that the best use is not made of the communication network provided with the fast interface.

Figure 5:
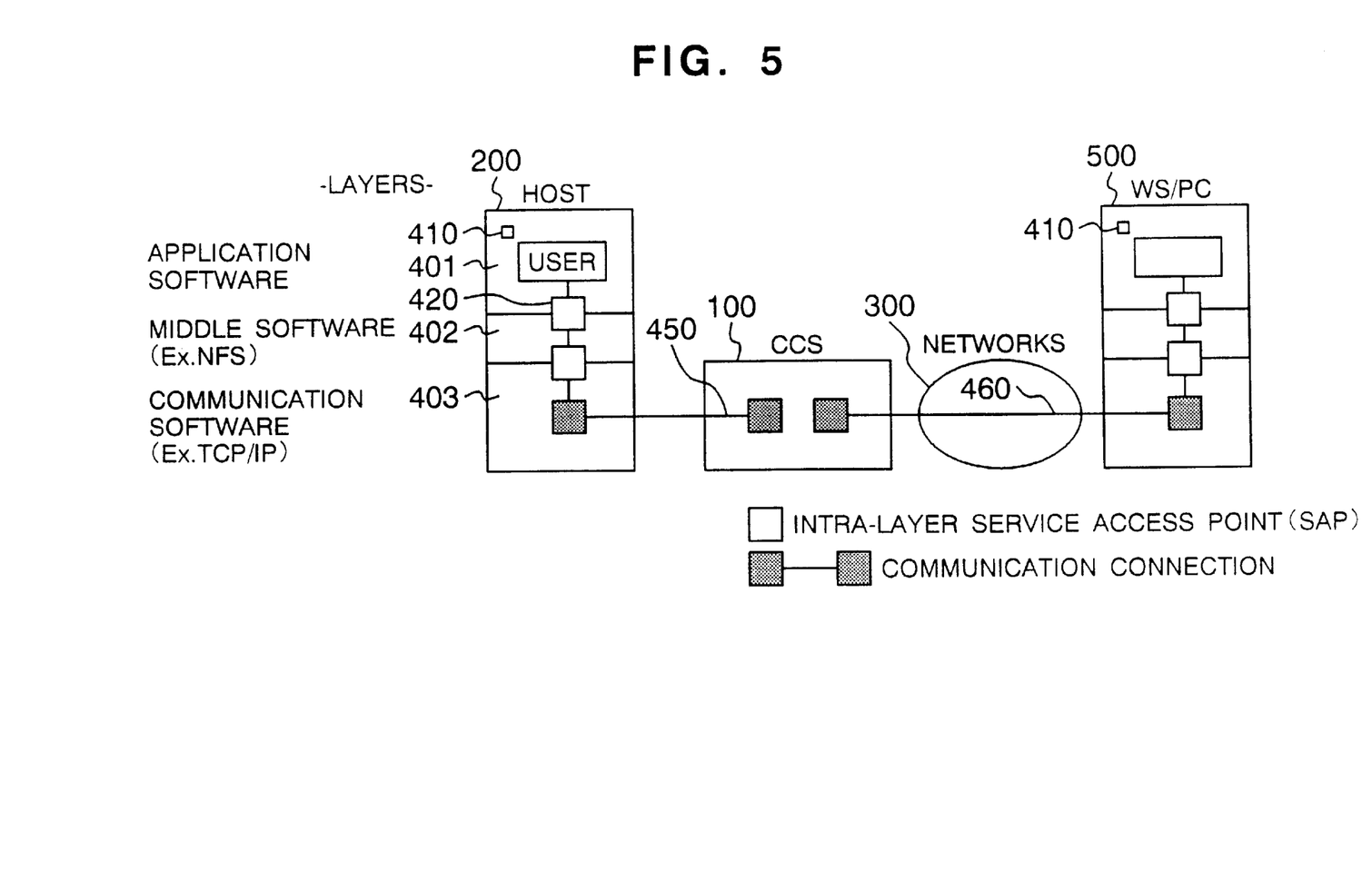

FIG. 5 illustrates a logical layered structure of a connection between the HOST 200 and the WS/PC 500.

In the software layered structure of the HOST 200 and the WS/PC 500 shown in FIG. 5, a numeral 401 denotes an application software layer containing a user program (User) 410. A numeral 402 denotes a middle software layer of which, for example, a network file system (NFS) takes charge. A numeral 403 denotes a communication software layer of which, for example, the TCP/IP takes charge.

A numeral 420 denotes a service access point (SAP) that takes charge of an interface between the foregoing software layers. A numeral 450 denotes a communication connection made between the HOST 200 and the CCS 100, concretely, a local connection. Likewise, a numeral 460 denotes a connection made between the CCS 100 and the WS/PC 500, specifically, a remote connection.

The User 410 of the HOST 200 is connected to the User 410 of the WS/PC through the SAP 420 and the communication connections 450 and 460. The communication connections 450 and 460 may be connections of a transport layer of the TCP/IP. In place, the communication connection 450 may be a special connection composed of a specific channel of the HOST 200. One connection may be made on one communication mechanism that has different properties such as a physical transmission speed and a transmission distance from the other communication mechanism on which the other connection is made. Both of these connections are not required to utilize the same procedure for realizing a communication function.

In general, the following feature difference exists between the channel and the LAN.

For example, in terms of the topology, the channel is built on a master-slave basis, while the LAN is built on a peer-to-peer basis.

The channel corresponds to the so-called I/O interface. Specifically, it indicates the operation of the slave, that is, the CCS 100 on a kind of command group called channel control words (CCW) one-sided issued by the master, that is, the HOST 200.

In terms of the distance, the channel is as short as several hundred meters, while the LAN is as long as several tens of kilometers. The LAN basically contains multi-stepped repetitions, that is, plural repeat mechanisms. The channel is basically implemented based on a connection-oriented communication scheme, while LAN is based on a connectionless communication scheme.

Further, the channel is different in speed, realtime constraints and fair access from the LAN. Hence, the same procedure is not required to connect (communicated with) the connections made on the channel and the LAN.

The CCS 100 operates to match one connection to the other connection so that the data received through one connection is repeated to the other connection. The connection correspondence may be one to one or one to N (plural). In this embodiment, for the description's sake, the one-to-one correspondence is selected.

Figure 6:
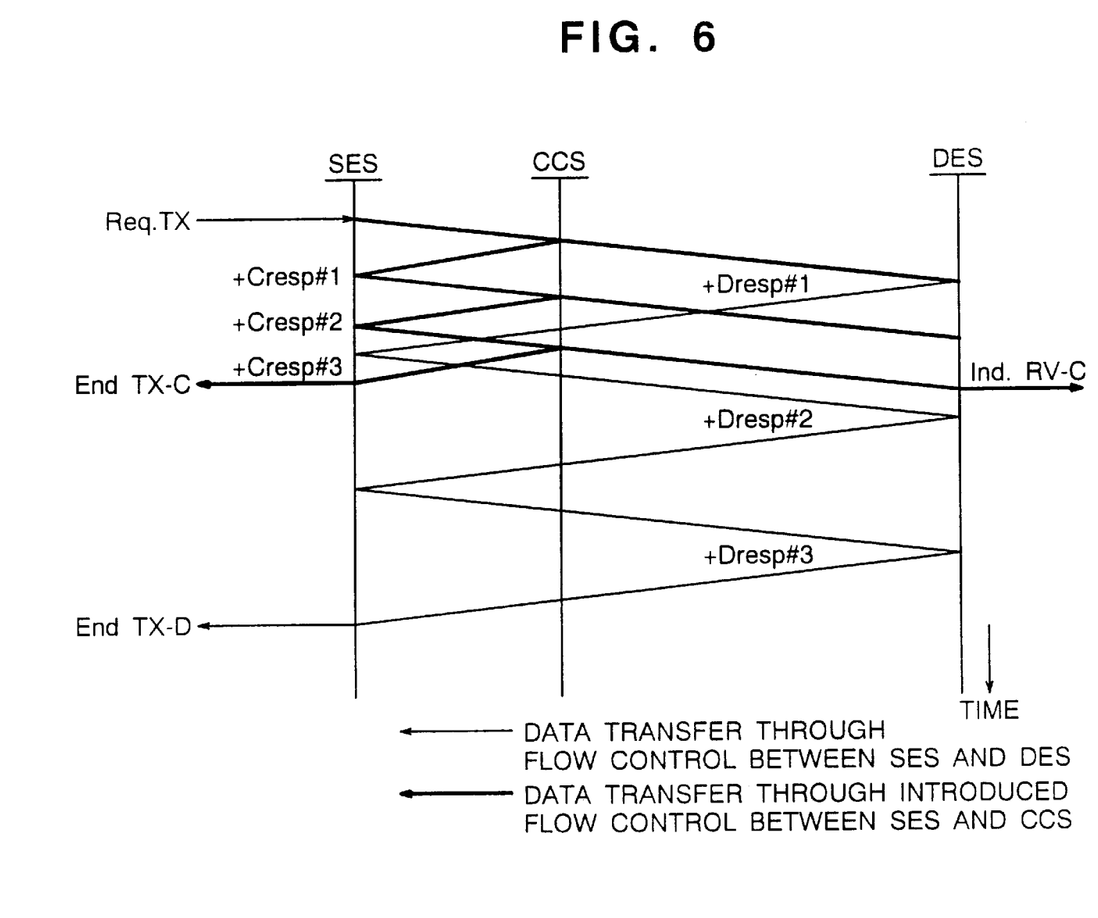
FIG. 6 is a sequence chart showing data transfer executed if the CCS controls a flow rate.

FIG. 6 illustrates the data transfer sequence executed when of introducing the flow control to the CCS (between the SES and the CCS) according to an embodiment of the present invention.

As in FIG. 4, the sequence is illustrated on a time-series basis together with the sequence of the prior art shown in FIG. 4 executed in giving the flow control between the SES and the DES. This illustration is intended to more clearly indicate the difference of the communication performance between both of the cases.

When the CCS receives in its buffer the amount of data from the SES at a first transfer, of course, the amount of data being equal to or smaller than the window size, the CCS transmits the acknowledge +Cresp#1 to the SES and immediately transfers to the DES the data sent from the SES.

When the SES receives the acknowledgement Cresp#1 from the CCS, the SES performs the second data transfer of the data that is equal to or smaller than the window size to the CCS. Then, when the CCS receives the data sent at the second transfer, the CCS transmits the acknowledgement +Cresp#2 to the SES.

The CCS continuously transmits the data sent from the SES.

Later, as shown in FIG. 6, the CCS performs the third data transfer and then terminates the data transfer. The CCS transmits the acknowledgement +Cresp#3 to the SES. The SES receives the acknowledgement +Cresp#3 and generates the indication about data transmission end (End TX-C). On the termination of the data transfer from the CCS, the DES generates the indication about data reception.

Figure 7:
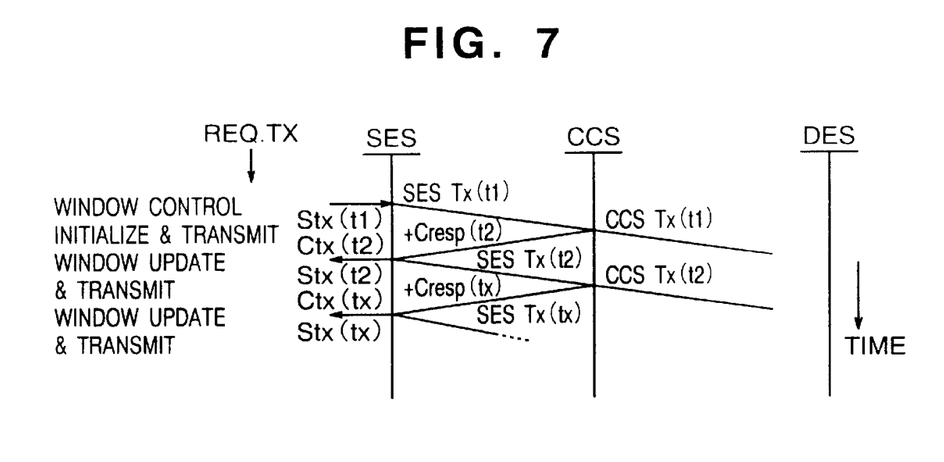
FIG. 7 is a sequence chart showing transmission and reception of data between the source end system (SES) and the CCS.
Figure 8:
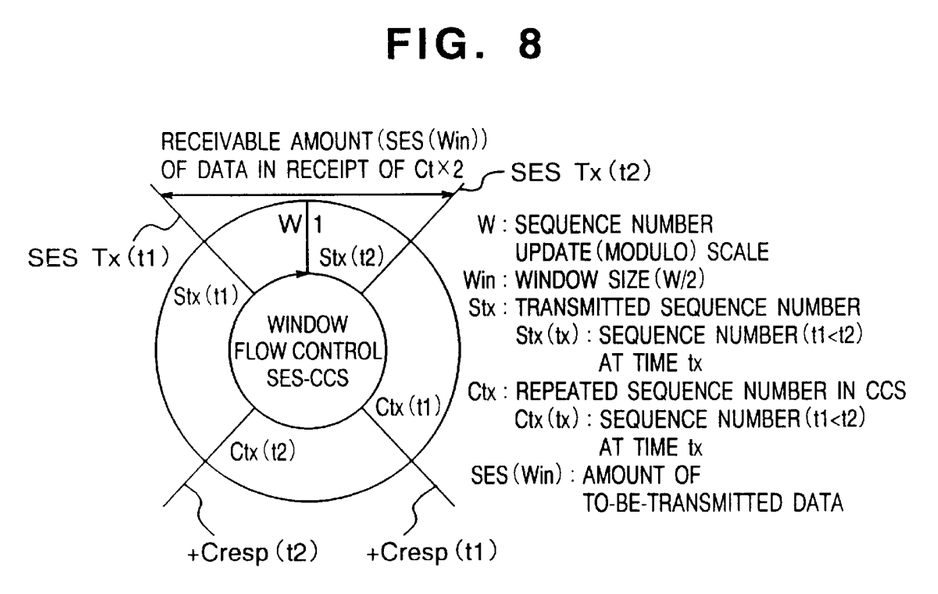
FIG. 8 is an explanatory view showing a control for a window flow between the source end system (SES) and the CCS.
Figure 9:
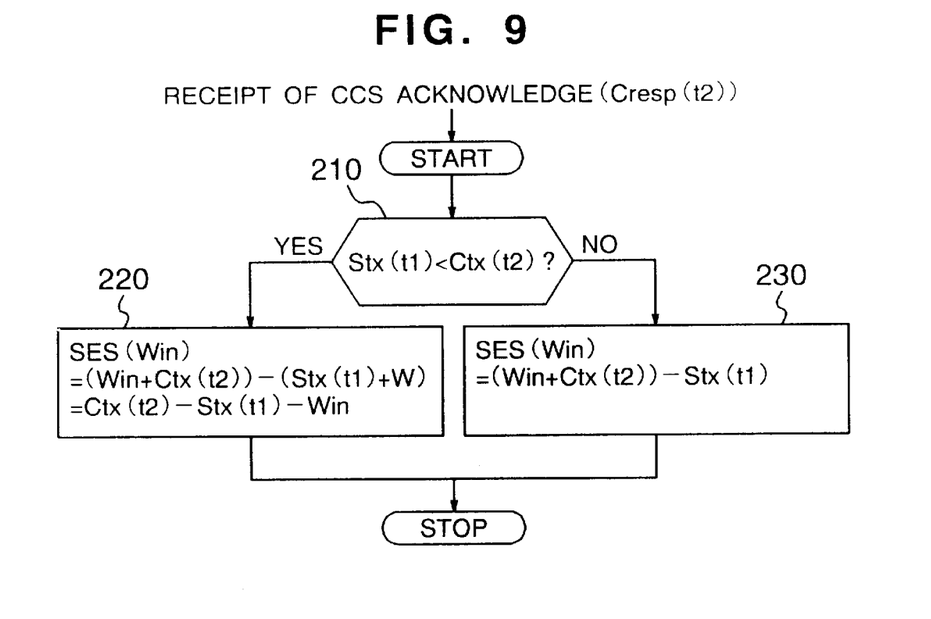
FIG. 9 is a flowchart showing a routine of calculating an amount of data to be transmitted on the basis of the control for the window flow between the SES and the CCS.

FIGS. 7 to 9 illustrates a procedure for controlling a window flow according to an embodiment of the invention. This procedure is executed for the data transfer between the SES and the CCS.

In FIG. 7, when the SES receives the request for data transmission (Req. TX) from its upper software, the SES initializes the window flow control, such as setting of the window size and resetting of a sequence number (SEQ), according to the predetermined procedure. The sequence number (SEQ) is defined as a serial number given at each set of a given amount of data to be transmitted. The set of data amount is represented by the quantity of data transmitted by the upper software (layer) for each query. The SES operates to concurrently transmit the data (SES TX(tx)) and set the transmitted sequence number (Stx (tx)). As mentioned above, before the source end system, herein, the CCS send the acknowledgement, the SES may transmit plural packets. Like the above case, FIG. 7 shows the sequence for one transmission as well.

The CCS sends the acknowledgement (+Cresp(tx)) to the source end system (SES) each time the CCS receives the given amount of data.

The acknowledgement may contain information about the receive status such as the overall amount of data given from the start to the end of the data transfer of the SES and the amount of repeated data. In this embodiment, the acknowledgement contains the information indicating the overall amount of data given from the start to the end of the data transfer from the SES to the destination end system (DES). Specifically the transmission sequence (Ctx(tx)) of the CCS is contained in the acknowledgement of the CCS.

In receipt of the ACK of the CCS, the SES calculates the amount of data to be transmitted (SES (Win)) according to the control procedure shown in FIGS. 8 and 9. Then, the SES the data according to the same procedure and update the window. That is, the SES can perform the next data transfer when the SCS has repeated the current data packet to the DES, more accurately, when the information about the end of repeat has reached the SES. The system of the invention, therefore, makes it possible to dynamically increase the apparent window size by the amount of data repeated to the DES, thereby improving the communication performance.

In FIG. 7, the transmission (SES TX(tx)) from the SES to the CCS, the acknowledgement (+Cresp(tx)) given from the CCS to the SES and the repeat (CCS TX(tx)) from the CCS to the DES are executed for the transmission of each data packet. As described below about the embodiment shown in FIG. 10, they may be executed for the transmission of plural data packets. The essential functions of these two cases are the same as each other.

In the foregoing description, the CCS has given back the ACK (+Cresp (tx)) to the SES each time the CCS receives a predetermined amount of data. In place, the reply of the ACK to the SES may be event-driven. That is, the ACK may be given back to the SES at a given event, for example, when the repeat of the predetermined amount of data is terminated or when a given time is passed.

The procedures about the data transmission of the SES and the ACK of the CCS are achieved by the known arts.

FIG. 8 concerns the window flow control of the SES between the SES and the CCS and illustrates a relation between the transmission sequence number of the SES and the receive sequence number of the CCS at a time point in the communication.

As shown in FIG. 8, each sequence number is set in the module-W round-robbin scheduling manner. That is, with increase of a total amount of data, the sequence number is made greater and needs a greeter number of bits. In order to overcome this shortcoming, the module-W round-robbin scheduling is used for setting each sequence number.

Win denotes a window size. Herein, it is set as a half of a modulo W (W/2). Stx denotes a sequence number of transmitted data packets (called a transmitted sequence number) used on the SES side. Ctx denotes a sequence number used on the CCS side, which indicates the sequence number of the data transmitted to the DES (called a transmitted sequence number). These two sequence numbers are indicated on a time base.

SES(Win) denotes an amount of data to be transmitted at any time. The amount may be calculated by the below-described procedure shown in FIG. 9, for example. SES (Win) means the amount of to-be-transmitted data ranging from a time point when the ACK is received to a value of W/2.

FIG. 9 illustrates a procedure of calculating the amount of to-be-transmitted data (SES(Win)) on the SES.

When the SES receives the ACK (+Cresp(t2)) from the CSS, at first, the SES compares the transmitted sequence number (Stx(t1)) with the sequence number of the repeated data packet (called a repeated sequence number) (Ctx(t2)) picked out of the ACK (step 210).

If Stx(t1) is smaller than Ctx(t2), it indicates that the Stx(t1) is turned around the modulo W and enters the next round. In this case, the SES(Win) is a value derived by subtracting the transmitted sequence number (Stx(t1)) of the SES and the modulo size (W) from the addition of the window size (Win) and the transmitted sequence number (Ctx(t2)) (step 220).

On the other hand, if the Stx(t1) is larger than Ctx(t2), the SES(Win) is a value derived by subtracting only the transmitted sequence number (Stx(t1) of the SES from an addition of the window size (Win) and the transmitted sequence number (Ctx(t2)) of the CCS (step 230).

The remaining amount of to-be-transmitted data is basically calculated by subtracting the transmitted data from the maximum transmittable amount of the station (SES) and adding the repeated amount of data to the subtracted result. In other words, the transmitted data of the SES is subtracted from the window size. Then, the data transmitted, that is, repeated from the CCS to the DES, is purged out of the buffer of the CCS. The space for the repeated data is reserved in the buffer. The reserved volume is added to the subtracted result. Then, the SES operates to transmit the amount of data calculated by the SES(Win) to the CCS.

If the data amount calculated by the SES(Win) is made zero, that is, SES(Win)=0, no data transfer is carried out.

The SES(Win) next to the SES(Win)=0 is calculated on the transmission sequence number Ctx contained in the ACK to the n-th data transfer from the SES, if the SES has already performed the n-th data transfer and the CTx given at SES(Win)=0 is the transmission sequence contained in the ACK to the (n–1)th data transfer from the SES.

Then, the SES operates to transmit the amount of data calculated on the SES(Win). The foregoing procedure and the procedure of updating the transmission sequence number are both achieved by the known prior arts. Later, the foregoing procedure is repeated for transferring the data.

Figure 10:
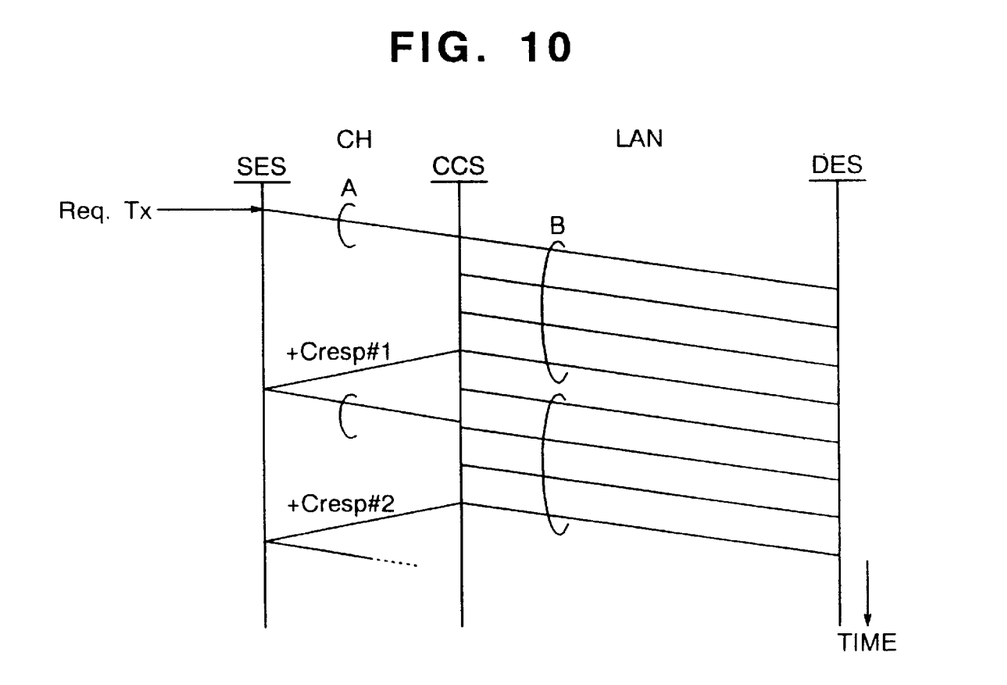
FIG. 10 is a view showing control for a flow rate between the SES and the CCS according to another embodiment of the present invention.

FIG. 10 illustrates the flow control between the SES and the CCS according to another embodiment of the present invention. In this embodiment, a difference of a transmission unit amount exists between the unit amount from the SES to the CCS and that from the CCS to the DES.

In general, a large difference of, for example, a transmission rate of the LAN 300 exists between the channel CH150 and the communication network. The data amount to be transmitted by the former is different from that by the latter.

For example, if the amount of one transmission (such as a maximum packet size) from the SES to the CCS corresponds to the amount of four transmissions from the CCS to the DES, the CCS gives back the ACK (+Cresp#x) to the SES when the CCS sends out four transmissions.

The SES transmits the next data packet in response to the ACK from the CCS.

When the CCS completes the four transmissions, the CCS reserves an empty area for the transmitted data in a receive/transmit buffer, where the new data packet can be put, and then gives a request for the next data transmission to the SES. Later, the data transfer between the SES and the CCS is executed according in this embodied procedure.

In this embodiment, as soon as the CCS repeats the data, the CCS sends the ACK to the SES. When the predetermined amount of data is repeated to the DES, the ACK may be sent from the CCS to the SES. For example, if an empty area appears in the buffer, it is important to transfer the data for the empty volume from the SES to the CCS.

As such, the CCS performs the data transmission to the DES and the data reception from the SES. For example, obviously, the system in which the data to be transmitted is reserved is more efficient than the system in which the CCS gives back a request for the data transmission to the SES when the transfer of the overall data in the buffer is completed. The CCS supplies the corresponding amount of data from the SES to the empty area of the buffer, that is, the data amount transmitted to the DES.

Figure 11:
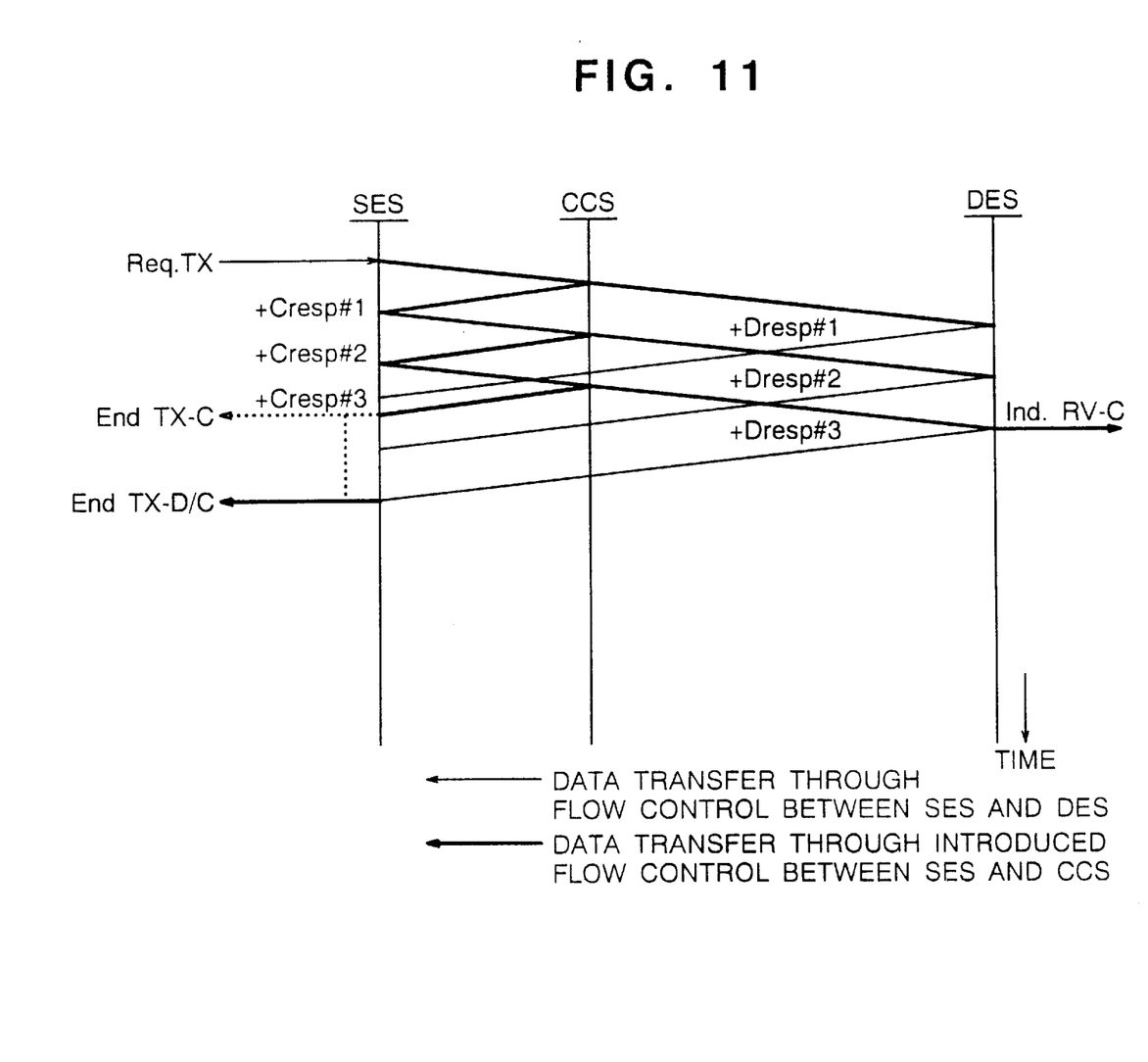
FIG. 11 is a sequence chart showing a data transfer sequence executed in transferring data between the SES and the destination ES (DES) according to the two flow rate controls between the SES and the CCS and between the SES and the DES.

FIG. 11 illustrates a data transfer sequence provided if the data transfer between the SES and the DES is executed according to the addition of the flow control between the SES and the DES to the flow control between the SES and the DES.

The DES sends the ACK when the DES receives the predetermined amount of data from an either station of the SES and the CCS. As is obvious from FIG. 10, the indication about data transmission end given by the SES is divided into two types.

One type is an indication about data transmission end (End TX-C) given between the SES and the CCS. The completion of the data transmission at least to the level of the CCS is reported to the host software. The other type is an indication about da a transmission end (End TX-D/C) given between the SES and the DES. The completion of the data transmission up to the destination end system (DES) is reported to the host software.

Both of the indications are shifted in time. Which of the indications and how it is used are determined by the specification of the host software.

For example, if the CCS and the communication network are reliable, the completion of the data transmission to the DES may be assumed at the stage of the END TX-C. The next operation may be started more rapidly. The CCS has to reliably transfer the data received from the SES to the DES. If the CCS fails in the data transfer, the data transfer between the CCS and the DES is allowed to be retried. The failure of the data transfer may be indicated to the SES. The retrial and the indication are achieved by the known prior arts.

In the foregoing description, the CCS is located as a connecting unit between the HOST 200 and the communication network 300 through the CH 150. The system of the foregoing embodiment is just one connecting form of various computer devices. Hence, the relation between the CCS and the HOST is not necessarily limited to the foregoing relation. The relation between the CCS 100 and the HOST 200 may be made more flexible.

Figure 12:
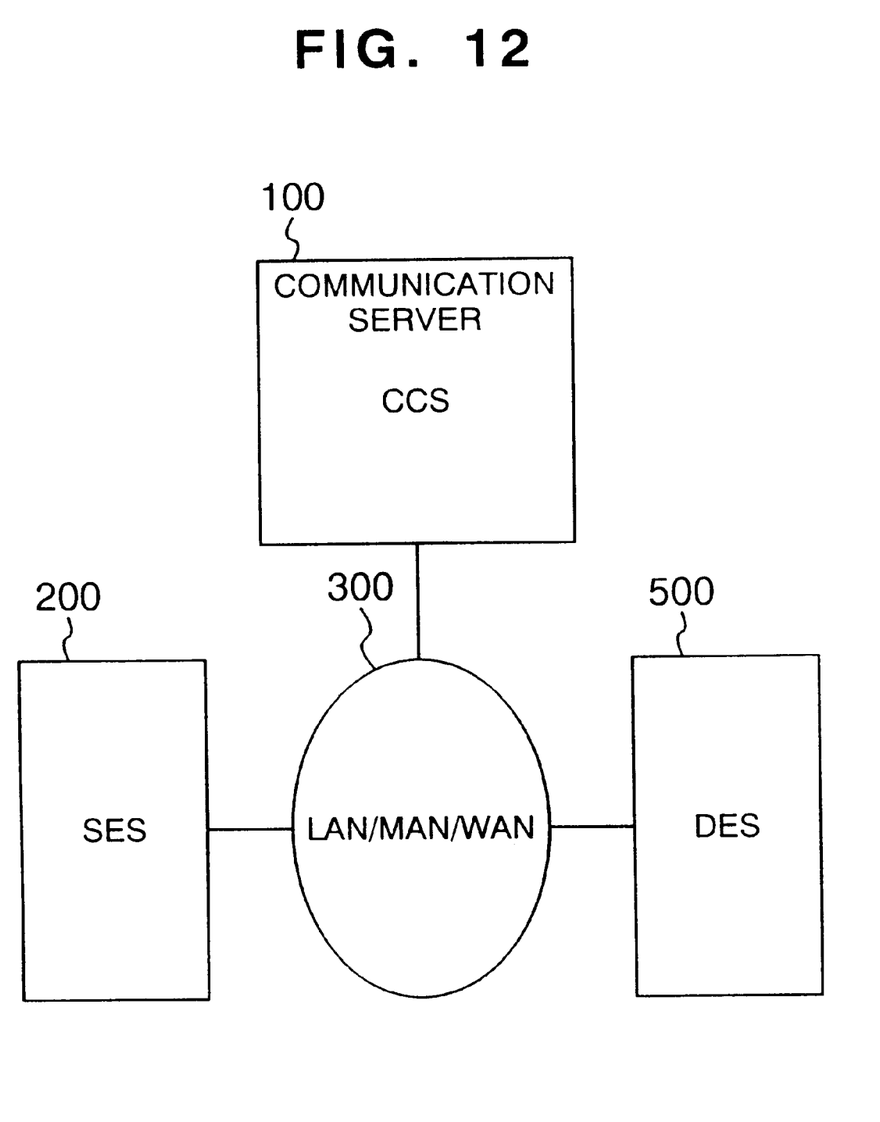
FIG. 12 is a block diagram showing an arrangement of a system according to another embodiment of the present invention.

FIG. 12 is a concept view showing an arrangement of the system to which the present invention is applied. For example, consider that the CH 150 cannot be distinctly separated from the so-called LAN from a technical point of view. As one applied arrangement, the HOST 200 may be connected to the CCS 100 through the communication network 300.

For the communication network, like the foregoing ATM network, there are provided many kinds of network services (configurations) each having the corresponding speed and quality. Any one can easily consider that the CCS may connect to lines with respective characteristics, that is, lines with respective qualities of service (QOS) defined at the time setting the lines. The CCS may be put into a position for a communication server for taking charge of the data transfer, in particular, a leased server therefor. The CCS located anywhere in the communication network is shared by plural SESs or DESs. They may make their connections to the CCS at a time.

Considering that the SES has an equal relation with the DES, the communication servers functioning as the CCS's may be provided for the SES and the DES. The multistage communication servers functioning as the CCS's may be provided in one connection between the SES and the DES.

Figure 13:
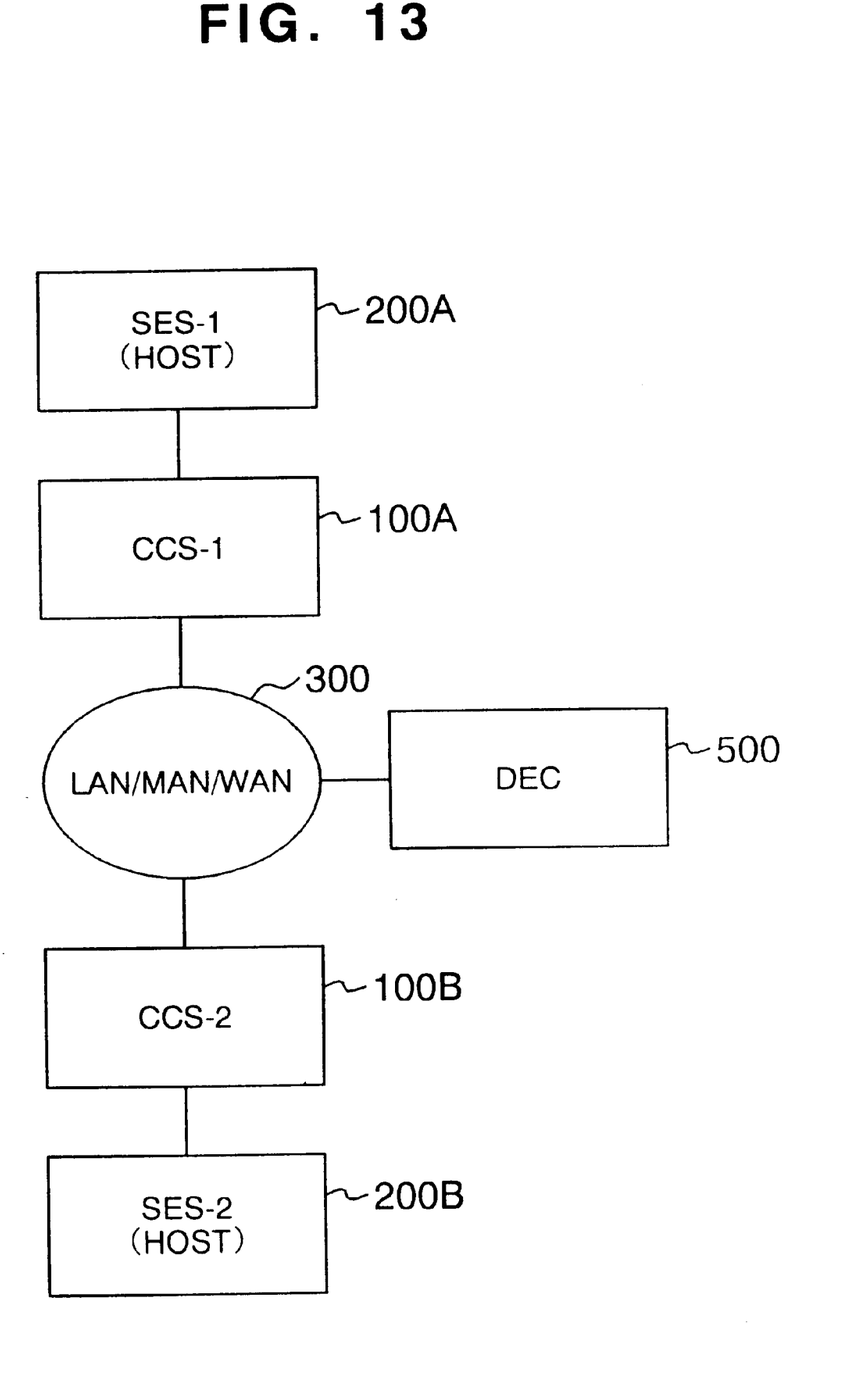
FIG. 13 is a block diagram showing a modification of the present system in which a plurality of SESs and DESs are connected to a network.

The connection between the SES and the DES may be arranged by the series connection of individual connections as shown in for example FIG. 13 so that the SES may operate to pseudoly treat the communication status on the first connection to be made as the communication with the DES. The ACK may be given back at each connection. The SES can arbitrarily select the ACK given back through any one of those connections for defining it as completion of the predetermined communication.

According to the present invention, between the source ES (end system) and the CCS, the CCS may be operated as a virtual destination ES so that the communication between the source ES and the original destination ES may be pesudoly treated as the communication between the source ES and the CCS. This operation can push up the communication performance such as a throughput and a turnaround time between the computer devices.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A communication method for performing communications in a communication system including a host computer, a communication control station, and a communication end system, a local connection established between said host computer and said communication control station and a remote connection established between said communication control station and said communication end system, to exchange data between said host computer and said communication end system through said communication control station, said method comprising the steps of:

transferring, by said communication control stations, data received from said host computer through said local connection to said remote connection and sending, by said communication control station, information regarding the amount of said data to said host computer through said local connection at each transfer timing of a predetermined data amount; and changing, by said host computers, in response to reception of said data, a window size indicative of an amount of a transferable protocol data unit permissible without reception of an acknowledgement from said communication end system, to transfer data corresponding to the amount of transfer data to said communication control station to thereby transfer data between said host computer and said communication end system.

2. A communication method as claimed in claim 1, further comprising the steps of:

transmitting to said host computer an acknowledgement including information indicating an amount of data both received from said host computer and then transmitted to said remote connection; and determining, by said host computer, an amount of data derived by subtracting an amount of data transmitted to said communication control station from an amount of said data contained in information transmitted from said communication control station added to a window size as an amount of data to be transmitted to said communication control station, and transmitting a next data according to the determined amount.

3. A communication method as claimed in claim 1, further comprising the steps of:

sending, by said communication control station and communication end system, respective acknowledgements to said host computer; and selecting, by said host computers, any one of said acknowledgements for determining completion of the transmission.

4. A communication method applied to a communication system arranged to have two or more communication end systems, one or more communication servers and a communication network and to make one or more local connections between said communication end systems and said communication servers and one or more server connections between said communication servers, said method comprising the steps of:

changing, by a source end system representing a data transmission side of each of said communication end systems, a window size indicative of an amount of a transferable protocol data unit without reception of an acknowledgement from a destination end system representing a data receiving side of each of said communication end systems, for performing said communication.

5. A communication method as claimed in claim 4, further comprising the steps of:

sending, by said communication servers located on the receiving side or said communication end systems, respective acknowledgements to said source end systems; and selecting, by said source end systems, any one of said acknowledgements for determining completion of the transmission.

6. A communication method for performing communications in a communication system including a host computer, a communication control station, and a communication end system, a local connection established between said host computer and said communication control station and a remote connection established between said communication control station and said communication end system, to exchange data between said host computer and said communication end system through said communication control station, said method comprising the steps of:

sending, by said communication control station, an acknowledgement to said host computer in response to a given amount of data transferred from said host computer through said local connection, said amount of data transferred exceeding a window size indicative of an amount of a transferable protocol data unit permissible without receiving an acknowledgement from said communication end station;

determining, by said host computer, a next transfer of the given amount of data in response to said acknowledgement from said communication control station and transmitting the data to said communication control station; and receiving, by said communication end system, said data from said communication control station through said remote connection, said data being received from said host computer through said local connection, and thereby to complete transfer of said data between said host computer and said communication end system, independently of the transfer of said data between said host computer and said communication control station.

7. A communication method as claimed in claim 6, further comprising the steps of:

sending acknowledgement from said communication control station and said communication end system to said host computer, respectively; and enabling said communication control station to select any one of said respective acknowledgements for determining completion of the transmission of said data.

8. A communication method as claimed in claim 6, further comprising the step of enabling said communication control station to send said acknowledgement to said host computer in response to a predetermined event taking place in terms with the reception of said data through said local connection.

9. A communication method as claimed in claim 6, further comprising the steps of:

enabling said communication control station to send to said host computer the acknowledgement including information regarding an amount of data both received from said host computer and transmitted to said remote connection; and enabling said host computer to determine an amount of data to be transmitted to said communication control station as an amount of data derived by subtracting an amount of data transmitted to said communication control station from an addition of an amount of said data contained in the information of said acknowledgement sent from said communication control station.

10. A communication system, comprising:

a host computer;

a communication control unit;

at least one communication terminal;

wherein a local connection is established between said host computer and said communication control unit and a remote connection established between said communication control unit and said communication terminal to exchange data between said host computer and said communication terminal through said communication control unit, wherein further:

said communication control unit includes means for sending an acknowledgement to said host computer in response to receipt of information regarding a given amount of data transferred through said local connection from said host computer at each transfer timing of a predetermined amount of data, said host computer includes means for determining if a next transfer of a given amount of data is made possible in response to the acknowledgement from said communication control unit changing a window size indicative of an amount of a transferable protocol data unit permissible without reception of an acknowledgement from said communication terminal and starting subsequent transmission of the given amount of data to said communication control unit, and said communication terminal includes means for receiving the data from said host computer to said communication control unit through said local connection and then transferred from said communication control unit through said remote connection to complete transfer of said data between said host computer and said communication terminal.

11. A communication system as claimed in claim 10, wherein said communication control unit and said communication terminal includes means for sending an acknowledgement to said host computer, respectively, and said communication control unit includes means for selecting any one of said respective acknowledgements for determining completion of the transmission of said data on said selected acknowledgement.

12. A communication system as claimed in claim 10, wherein said communication control unit includes means for sending to said host computer an acknowledgement having information regarding an amount of data both received from said host computer and transmitted to said remote connection, and said host computer includes means for operating and determining an amount of data derived by subtracting an amount of data transmitted to said communication control unit from an addition of an amount of data of said information contained in said acknowledgement sent from said communication control unit to a window size as an amount of data to be transmitted to said communication control unit.

13. A communication system as claimed in claim 10, wherein said local channel is implemented by a channel and said remote connection is implemented by at least one of a LAN, a MAN and a WAN.

14. A communication system as claimed in claim 10, wherein said communication control unit includes means responsive to said acknowledgement sending means, for dynamically expanding a window size for the communication terminal over a predetermined size.

15. A communication method for performing communications in a communication system including first, second and third communication stations, a local connection established between said first communication station and said second communication station and a remote connection established between said second communication station and said third communication system, to exchange data between said first and third communication stations through said second communication station, said method comprising the steps of:

transferring, by said second communication station, data received from said first communication station through said local connection to said remote connection and send information regarding the amount of said data to said first communication station through said local connection at each transfer timing of a predetermined data amount; and changing, by said first communication station in response to reception of said information, a window size indicative of an amount of a transferable protocol data unit without reception of an acknowledgement from said third communication station, to transfer data corresponding to the amount of transfer data, to said second communication station to thereby transfer data between said first communication and said third communication system.

16. A communication system, comprising:

first, second and third communication stations;

a local connection established between said first communication station and second communication station; and a remote connection established between said second communication station and said third communication system, to exchange data between said first and third communication stations through said second communication station, wherein said second communication station comprises means for transferring to said remote connection data received from said first communication station through said local connection and sending information regarding the amount of said data to said first communication station through said local connection at each transfer timing of a predetermined data amount; and said first communication station comprises means for changing, in response to reception of said information, a window size indicative of an amount of a transferable protocol data unit without reception of an acknowledgement from said third communication station, to transfer data corresponding to the amount of transfer data, to said second communication station to thereby transfer data between said first communication station and said third communication system.

17. A communication system according to claim 16, wherein said second communication station operates to control the communication protocol load between said first and third communication stations.

18. A communication system, comprising:
a communication control terminal for use in a communication system including at least first and second communication terminals, said communication control terminal serving to exchange data between said first and second communication terminals, wherein
said communication control terminal establishes a local connection between said first communication terminal and said communication control terminal and a remote connection between said first communication terminal and said communication control terminal,
said communication control terminal comprises means for transferring to said remote connection data received from said first communication terminal through said local connection and for sending information regarding the amount of said data to said first communication terminal through said local connection at each transfer timing of a predetermined data amount to said communication control terminal, and
said first communication terminal changes, in response to reception of said information, a window size indicative of an amount of a transferable protocol data unit without reception of an acknowledge from said second communication terminal, to transfer data corresponding to the amount of transfer data, to said second communication station to thereby transfer the data between said first communication terminal and said second communication terminal.

* * * * *